May 19, 1959     J. E. TROTTIER     2,887,589
SYSTEM FOR THE SAFE AND STABLE OPERATION OF ALTERNATORS
Filed Aug. 26, 1955
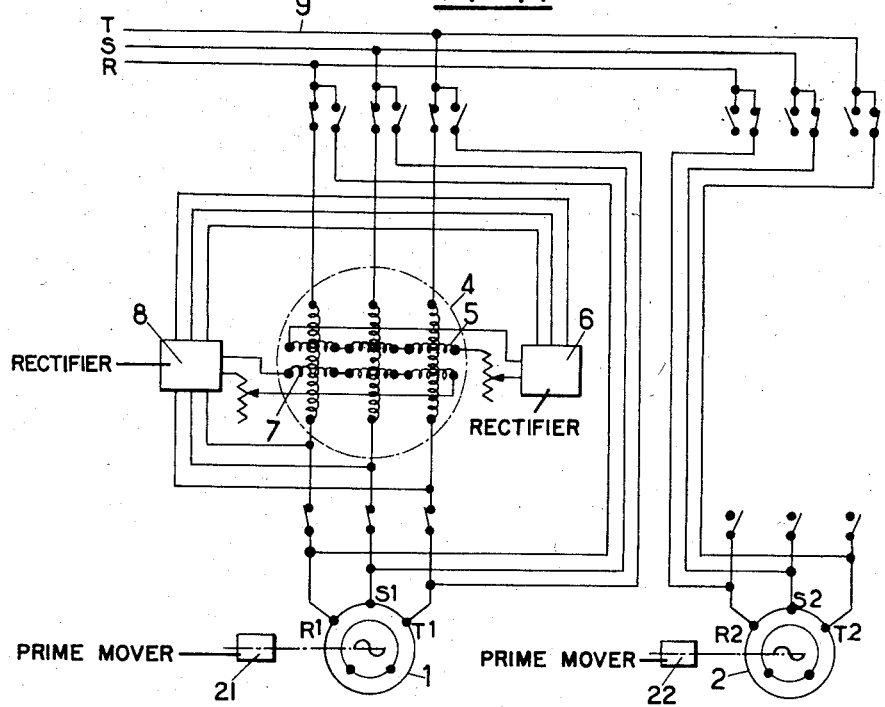
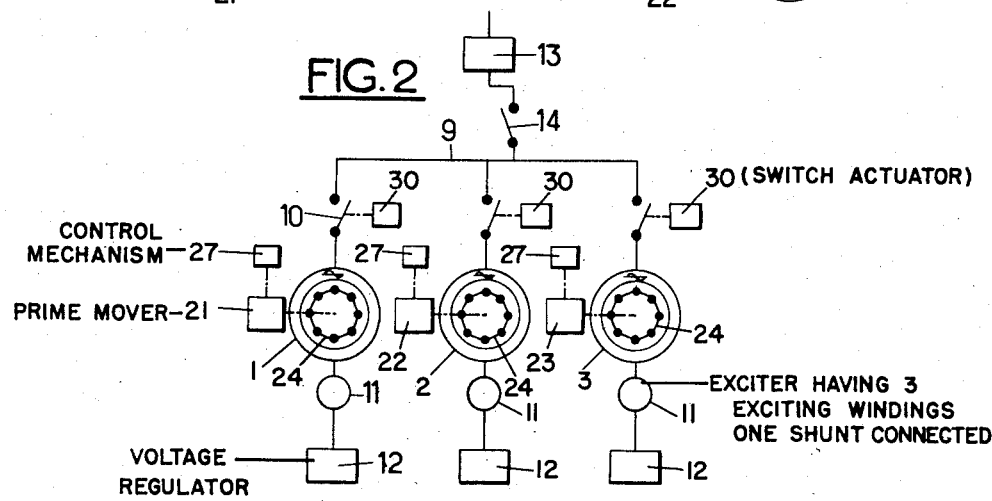
INVENTOR
Jean E. Trottier
By: *[signature]*
ATTORNEYS United States Patent Office 2,887,589
Patented May 19, 1959

2,887,589

SYSTEM FOR THE SAFE AND STABLE
OPERATION OF ALTERNATORS

Jean Emile Trottier, Pantin, France, assignor to Societe Gramme, Pantin, France, a corporation of France Application August 26, 1955, Serial No. 530,746

Claims priority, application France September 10, 1954

8 Claims. (Cl. 307—87)

The present invention relates to a system arranged for maintaining the safe and stable operation of alternators, and particularly of alternators working in parallel, without risk of inadmissible mechanical and electrical overloads.

It is known, on the one hand, that an alternator is difficult to operate in such a way that it may be easily coupled in parallel with at least one separate alternator or with a network already brought in normal operation, and, on the other hand, when utilizing the usual arrangements, it is admitted as difficult or impossible to keep an alternator normally working in case of working disturbance, particularly in the case of a defect such as a short circuit occurring at the connection between the said alternator and the bus bars, in a distributing network or in a current utilizing apparatus.

It is also known that, under conditions which presently are considered as normal, the parallel coupling of an alternator with other alternators, or a network, already brought in normal operation requires frequency equality, voltage equality and phase coincidence, which presumes skilled operators and time consuming and precise operations as well as complicated and costly apparatus.

It is further known that, in order to protect an alternator, particularly an alternator coupled in parallel, from the detrimental electrical or mechanical effects of a fault occurring in any point of the distribution circuits, the means utilized at present comprise automatic quick action type circuit breakers with high interrupting capacity and, eventually, with automatic quick-action relocking, i.e. also with complicated and costly devices.

In numerous cases met in usual practice, it is very desirable that the service be considerably facilitated, without requiring the help of qualified people, so that all operations be automatically and quickly performed, and it is also highly desirable that the breaks of service be prevented or, at least, reduced to a minimum. This is particularly the case for independent power plants of small or medium capacity, and above all when the safety of a power plant in operation, as well when coupling an alternator as when the latter is running at normal speed, controls the working reliability of the whole installation supplied by alternators and often the safety of human life, as it is particularly the case on board of a ship.

It is an object of the invention to provide an equipment comprising at least one alternator which may be coupled in parallel and kept running by simple and economical means in case a fault occurs in the distribution system.

It is also an object of the invention to provide an equipment comprising at least one alternator which may be coupled in parallel with a distributing system already in normal service, without previously requiring to obtain a perfect respective equality of speeds and frequencies and phase coincidence.

It is a further object of the invention to provide an equipment by means of which the parallel coupling of an alternator may be automatically performed.

It is still another object of the invention to provide an equipment wherein the preparatory operations which previously were required from the operator for coupling an alternator in parallel are now dispensed with, the correcting operations eventually required being automatically performed by the alternator to be coupled and the auxiliary apparatus associated therewith.

It is likewise an object of the invention to provide an equipment wherein the coupling of said alternator, during its starting phase under the action of a primary motor in increasing speed, is automatically performed and a short while before said alternator to be coupled be in perfect synchronism with the rest of the network.

It is another object of the invention to provide an equipment wherein the total impedance of the circuit in which said alternator is connected is remarkably greater than in the case of similar equipments of usual types.

The invention further provides an equipment wherein the reactance of the alternator is remarkably greater than in the case of similar equipments of usual types, on account of the fact that my improved alternator is provided with and designed and dimensioned for an armature reaction which is particularly great.

Furthermore, the invention provides an equipment including impedance increasing means which consist in connecting preferably adjustable reactances in the output conductors of the alternator.

The invention also provides an equipment including impedance increasing means which consist in connecting eventually adjustable ohmic resistances in the output conductors of the alternator.

The invention still provides an equipment wherein the exciter of the alternator is provided with means which are designed and dimensioned for supplying such a maximum tension that the ratio of said maximum tension to the normal tension is considerably greater than in the case of exciters of usual types.

The invention also provides an equipment wherein the exciter is placed under the control of a particularly quickly acting regulating device for regulating the alternator tension.

The invention also provides an equipment wherein the excitation of the alternator is regulated by a magnetic regulator.

These and other characteristics and advantages of the invention will be more fully understood upon reference to the description contained hereinbelow and to the accompanying drawings.

Considering that the invention has for its object to secure the safe performance of alternators, according to a first aspect of the invention, my improved system is designed for facilitating the coupling of an alternator driven by a prime mover with at least one other alternator, or the bus bars of the power plant, or a network already brought in normal operation.

Such parallel coupling of the alternator is facilitated by the fact that, according to the invention, the coupling is automatically performed and a short while before the alternator now starting has reached a perfect synchronism.

To this end, the inductor of the alternator comprises a damping winding which provides an asynchronous torque which, when associated with the driving torque provided by the prime mover, results in causing the inductor to rotate at a speed which is greater than the speed which would be provided by the prime mover alone. The dampers completely surround the polar wheel and involve but a small resistance. Owing to these arrangements, as the speed of the prime mover and, consequently, of the alternator to be coupled, increases, the respective differences between the frequency and the phase of the equipment already brought in normal operation, on the one hand, and the frequency and the phase of the alternator to be coupled, on the other hand, decrease and come to zero, under the action of the asynchronous torque provided by the inductor of the alternator.

As soon as the alternator has been connected, and due to the fact that then the phases are not in coincidence, a given voltage appears between on the one hand the machines already in normal service and already supplying current at the normal frequency $f$, and, on the other hand, the alternator to be coupled which provides a voltage at a frequency $f'$, which is lower than $f$, the frequency of said given voltage being equal to the average between both frequencies, namely $$\frac{f+f'}{2}$$

and the amplitude of said voltage being modulated at a frequency equal to one half of the difference between both frequencies, namely $$\frac{f-f'}{2}$$

which as it is well known, results in creating a circulating current which, according to the usual practice, is considered as undesirable, since its intensity may reach dangerous values in equipments of usual types.

In order to limit the intensity of the circulating current delivered by the alternator, my improved equipment comprises according to the invention impedances which, before starting, are connected in series in the output conductors of the alternator to be coupled, said impedances being eliminated when the synchronism is reached.

In the case of a simplified type of equipment, such impedances are essentially ohmic resistances designed for limiting the intensity of the synchronizing current passing through the alternator to be coupled to a predetermined value, in such manner that said intensity cannot reach a dangerous value; such resistances are temporarily connected in the circuits and, after the coupling has been effected, such resistances are successively eliminated according to a predetermined schedule. According to a preferred arrangement, there are two resistances by phase and, when the connection is being made, they are short-circuited successively by means of two contactors suitably time controlled by the main connecting switch connected between the alternator to be coupled and the equipment which is already in normal service.

The initial coupling operation consists in closing the output conductors of the alternator to be connected, which has been previously started and suitably excited but, according to the invention, such initial coupling operation is performed before the alternator has reached its nominal speed which corresponds to the working frequency of the network. Such initial operation may be made by hand. Preferably, said operation is controlled by a tachometer device measuring the speed of the alternator to be coupled and causing the connecting switch to close at the desired instant. Such device may be, for instance, a mechanical device comprising a differential the sun gears of which are respectively driven by two synchronous or asynchronous motors with low slipping characteristics, respectively connected to the network and to the alternator to be coupled, such tachometer device being designed and adjusted for performing the coupling operation when the frequency differential is decreasing and before said differential is reduced to zero.

In a more improved arrangement according to the invention, the impedances connected in the output conductors are no more substantially pure ohmic resistances but impedances comprising at least one ohmic resistance and one inductance, and even, eventually, one capacitance, the inductance being able, according to the operating schedule and the type of construction, to have a preponderant action. Owing to such arrangement, it is not only possible to reduce the intensity of the current in the output conductors of the alternator to be connected, as in the case of impedances made of pure ohmic resistances, but also to demodulate the currents circulating between the machines, so that said currents may prominently participate in the creation of synchronizing torques, while limiting the intensity thereof, as in the preceding case when pure ohmic resistances are utilized, as soon as the modulated tension causing such current to circulate has a tendency to increase such circulating current beyond a predetermined limit value.

The means utilized for obtaining such results are the following.

A variable impedance is introduced in each phase of the alternator to be coupled, each circuit of said impedance having one terminal connected with one of the alternator terminals and the other terminal connected with a terminal of same phase of an alternator, or of the network, already in normal service.

The value of the impedance is modulated by the modulated voltage between the terminals of the two electrical systems which are not yet synchronized, in such manner that the impedance be maximum when said modulated voltage is maximum and follows the variations of said voltage and the direction of said variations. The maximum value of the impedance is calculated in such a manner that the intensity of the circulating currents cannot exceed a predetermined maximum value.

The following description, given by way of a non limiting example of a device according to the invention, with reference to Fig. 1 of the accompanying drawings will help to better understand how said invention may be performed.

Assuming a three-phase alternator 1 is to be coupled with an alternator 2 already operating. Between the terminal $R_1$, $S_1$, $T_1$ of alternator 1 and the corresponding terminals $R_2$, $S_2$, $T_2$ of alternator 2 are connected the A.C. windings of a three-phase transducer system 4.

Such transducer system 4 has two separate D.C. windings utilized, in a known manner, for adjusting the impedance of the circuits of A.C. of the apparatus.

The first D.C. winding 5 carries a steady current which may be adjusted to the desired value, in order to obtain for the magnetic circuit of the transducer, the saturation defining the minimum value of the impedance of the A.C. circuits. Such D.C. may be supplied, for instance, by a rectifier 6 supplied by the alternator 2.

The second D.C. winding 7 is supplied by a rectifier 8 from voltages between the terminals $R_1$ and $R_2$, $S_1$ and $S_2$, $T_1$ and $T_2$ of the two machines 1 and 2, i.e. by the modulated voltages providing circulating currents between the alternator to be coupled 1 and the alternator 2 already in service.

Such second winding is so sized that, when the modulated voltage is at a maximum, the action of said winding opposes the action of the first winding, which results in reducing the continuous saturation of the magnetic circuit of the saturable reactance to zero and, consequently, in bringing the impedance of the A.C. winding of the apparatus to its maximum value. Such maximum impedance has been selected in order to limit the intensity of the circulating currents between the two alternators to be coupled to the desired value.

In the drawings:

Fig. 1 is a circuit diagram showing one embodiment of the invention directed to the coupling of a three-phase alternator already in service.

Fig. 2 is a circuit diagram showing a second embodiment of the invention designed to permit alternators to remain in service in spite of short circuits.

Like reference numerals denote like parts throughout the several views.

As the modulated voltage decreases, the effect of the second regulating winding decreases, which results in a decrease of the impedance of the A.C. winding. Consequently, the circulating currents, although they are lower than the value estimated as dangerous, are greater than they would be in the case the impedance had remained constant, and the synchronising action of these currents is accordingly maintained at a high value which allows to quickly speed up or slow down the machine, in order to bring the alternator 1 to be coupled to the same frequency than the alternator 2.

When coincidence between the phases of both alternators is obtained, the voltage at the terminals of the A.C. windings of the saturable reactance is reduced to a very low value. It is, therefore, possible to short-circuit these windings by connecting directly the corresponding terminals of both alternators with each other, and then completely eliminating such saturable reactance which has nothing to do anymore, after the alternators are coupled.

According to another aspect of the invention, a device is provided which is designed and built for securing a safe and stable performance of alternators, particularly of alternators running in parallel, by maintaining them in service in case of working disturbance when a defect, such as a short circuit, occurs in a connection between an alternator and bus bars, in a distributing circuit or a current utilizing receiver.

In protecting systems known to date for protecting A.C. generating and distributing equipments, the applied principle consists in disconnecting, as rapidly as possible, either the circuit wherein the defect occurs, or the generators supplying current to the location of the defect.

It has also been proposed to provide particularly for large networks quick relocking devices which operate after the occurrence of a fault and connect again the alternator which has been disconnected. Such devices practically secure a permanent service in spite of a temporary interruption of short duration, in the frequent cases when the defect has spontaneously disappeared after a very short lapse of time.

However, situations occur when it is not desirable to disconnect an alternator supplying current to the location of such fault, even in the case such fault is maintained during an appreciable time, since a disconnection might have dangerous consequences, particularly for the whole plant of which the electrical equipment is a fraction.

For instance, on board of ships having a power plant and A.C. distributing network of modern type, the disconnection of one or all alternators involves the risk of depriving the ship of current, i. e. practically, to place her in distress. Therefore, cases may occur where the equipment has been too perfectly designed and the remedy furnished for curing a small disturbance may result in a grave casuality.

To remedy such a drawback according to the invention, application is made of a principle which is altogether different from the accepted principles, which, in fact, is entirely opposed to them, said principle consisting, in case of a disturbance, not in disconnecting the alternators but, on the contrary, in maintaining them connected and in such conditions and by means of such skillful contrivances that they are able to carry the overload caused by said disturbance and without damage, remain coupled in parallel with each other and with the other alternators supplying current to the network, keep running during an appreciable time and resume their normal working without any other perturbation after the disturbance has been eliminated.

Such aspect of the invention is characterized by three essential features, namely: firstly, the provision of alternators so designed and dimensioned that they can remain connected without risk of excessive overheating even in the case of a relatively persisting disturbance; secondly, the provision of exciters associated with said alternators and liberally dimensioned which have an excitation system providing rapid overexcitations and deenergizations; thirdly, quick action regulators associated with said exciters and able to provide very rapid excitations, overexcitations and deenergizations.

In order that the general idea of the invention on this point, as well as the practical application thereof, be better understood, a preferred embodiment of same, selected as a non limiting example, will be hereinafter described in the case of a single alternator (the other alternators being similarly constructed) with reference to the Fig. 2 of the drawings.

The equipment according to the invention comprises:

(1) at least one alternator 1, practically of three-phase type driven by a prime mover 21, controlled by means of a control mechanism 27. Such alternator is characterized by two essential features:

(a) Its armature reactance has such a value that the intensity of its short-circuit current, even at maximum excitation, is sufficiently low that the alternator may bear it without inconvenience during a material time.

Previously, efforts were made to limit the voltage boosting of alternators to 7–8% between nominal full load running and no load running. Presently, a voltage boosting of the order of 20% is admitted. According to the invention, the systematically wanted voltage boosting is considerably greater than the aforesaid values, it being equal at least to 30 to 40%, preferably at least 35%, while admitting a corresponding armature reaction. Then, the ratio between the admissible short circuit intensity and the intensity at full nominal load is at least equal to 3.0–3.5 and the alternator is able to carry such current without damage during a material time, say 5 to 6 cycles;

(b) The alternator 1 is provided with very efficient damping windings 24 preferably constituted by bars, usually made of copper, passing through the polar pieces close to their peripheral surface, so that said bars are surrounded by a magnetic flux of high intensity, metal rings connecting the bars at the ends thereof. Such damping windings help to maintain the reactance of the machine at a high value and to reduce, according to the invention, the intensity of the short circuit current.

With regard to the magnetic circuit, the ratio between the number of ampere-turns of the armature at full load and the number of the magnetizing ampere-turns is of the order of 2 to 3.

It will be noticed that the means utilized for obtaining the above mentioned results comprise a reduction in size of the iron, without increasing the size of copper utilized and, in comparison with previous similar constructions they do not increase overall dimensions, weight or cost price.

The alternator 1 is connected on bars 9, by means of an interrupting apparatus 10, which may be a switch of medium mean breaking capacity and speed of action or even a set of disconnecting switches. Such switch is controlled by means of an electro-mechanism 30 controlling the connecting of said alternator 1 to bars 9.

(2) An exciter 11, of large size, which normally runs under a voltage materially lower than the maximum voltage, and intended for providing rapid overexcitations and deenergizations of the magnetic circuit of the alternator.

The maximum voltage is equal to 2 to 3 times, preferably 2.5 times, the voltage in normal running. When such value is provided, the necessary quickness of action upon the exciting field of the alternator may be easily obtained.

In a preferred embodiment, the exciter (designed with self-excitation for starting) has three magnetizing exciting circuits, one of said circuits being of shunt type, but it might be in series, in the cases where it would be advantageous to do so. The two other circuits are supplied by the voltage regulating device hereinafter described.

(3) An alternator voltage regulating device 12, of a very quick action type, for controlling the excitation of the exciters by cooperating with an exciter which is designed and built as described in point (2) above, in order to obtain very fast overexcitations and deenergizations of the alternator.

In a given embodiment, with which proving results have been obtained and which is hereinafter described without intention of limiting the invention to this specific form, said regulating device 12 is essentially arranged as indicated below.

It comprises a comparison device for comparing the voltage at the alternator terminals with a reference voltage provided by an auxiliary source. In a particular embodiment, the A.C. voltage at the alternator terminals, suitably reduced by known means (such as a voltage transformer), is converted into a D.C. voltage and said D.C. voltage is compared, by means of an opposition arrangement, in a comparison device of a known type, to a reference voltage, provided, for instance, by a battery. The difference between the rectified voltage and the reference voltage is utilized as the regulating parameter. Such parameter operates a magnetic regulator such as a saturable reactance. To this end, a current resulting from the differential voltage is caused to flow through the controlling winding of the saturable reactance, in such manner as to rapidly vary the voltage at the terminals of the exciter in the desired direction i.e. to increase such voltage as soon as the fault occurs, and to decrease it as soon as such fault has disappeared, whether the latter disappears spontaneously or under the action of other devices of the arrangement.

On the bars 9, supplied by alternators, such as 1, are connected utilizing devices, such as 13, by means of disconnecting apparatus, such as 14. According to the invention, the latter need not necessarily be automatic circuit breakers of the quick action type, nor have a high disconnecting capacity. All that is required is to utilize apparatus capable of disconnecting a device wherein a fault has occurred at the end of the transistory period during which such fault has been produced.

From the point of view of operation such arrangement according to the invention affords the following advantages.

The parallel coupling of an alternator designed and equipped according to the invention with other alternators is particularly easily performed, on account of the high armature reaction and the efficient action of the dampers.

When the fault occurs between the bus bars, the alternators keep running in parallel, since the fault is in parallel with the circuits providing the normal distribution while supplying a current having an admissible total intensity which has been predetermined by means of an appropriate adjustment of the controlling circuits of the regulators. When the fault has been cancelled, either spontaneously or by means which are outside of the improved arrangement according to the invention, the alternators are still in parallel and resume their normal operation without any new trouble.

The safety provided by the process and arrangement according to the invention also benefits the receiving apparatus and devices themselves.

According to the invention, said apparatus and devices may be provided with protecting devices which are more simple, less slowly acting and less costly than the usual quick acting disconnecting devices.

For, the latter might not be utilized with advantage. As a matter of fact, if they too rapidly operate, they insulate the defective apparatus during the transitory phase of the alternators, namely before the tension applied to the bars has been reduced to zero, and at a time where the intensity of the currents delivered by the alternators is at a maximum.

In contradistinction, if as allowed by the invention, simpler and more slowly acting protecting devices are utilized, said protecting devices will only place the defective element out of action after the end of the transistory phase (5 to 6 cycles for the 50 or 60 cycle networks). At this moment, their terminal voltage will be equal to zero and the disconnecting devices will have no power to disconnect, since there will be no voltage, and the intensity to break will be relatively low, as it is that corresponding to the permanent running as corrected by the regulating action of the exciter regulating device.

The utilization of a saturable reactance has been described above on account of the fact that such device has a particularly rapid action, but any device having similar characteristics might be utilized instead, while remaining within the scope of the present invention.

What I claim is:

1. In combination with at least an alternator driven by a prime mover, damping circuits associated with the alternator inductor and producing an asynchronous torque in addition to the driving torque of the prime mover and facilitating the coupling operation by means of the circulating currents, said alternator having a high armature reactance capable of causing up to at least 40% increase in tension between full load and no load running; an exciter for said alternator capable of producing a voltage which may be equal to at least three times the normal running voltage, said exciter comprising three exciting windings, one of said windings being supplied by said exciter itself, a voltage regulating device quickly responsive to variations of voltage of said alternator and supplying two inducting circuits of said exciter in such a manner as to counteract undesirable accidental variations in the parameters of the output currents of said alternator; coils having variable impedances for counteracting the output current of said alternator and always limiting said output current to predetermined values; means for inserting said coils in the output conductors of said alternator preparatory to the coupling of said alternator and means for withdrawing said coils after the permanent normal running conditions are established; a starting unit automatically operated by a tachometer device for driving said alternator during the starting phase required for coupling said alternator with the other sources of current before the frequency equality and phase coincidence is obtained; and means for keeping said alternator running during at least six cycles in case of a fault causing disturbance in the installation.

2. In an A.C. generating and distributing system comprising a distribution line and a plurality of alternators supplying said line, at least one alternator provided with a damper winding, means for connecting said at least one alternator through a variable impedance to said line thereby permitting a synchronizing current to pass through said damper winding if said alternator and line are not in synchronism, means for comparing the output voltage of said at least one alternator with a desired voltage and automatically regulating the impedance of said variable impedance in proportion to the difference therebetween.

3. A system as claimed in claim 2 in which said variable impedance comprises a saturable reactance having its A.C. conductors inserted in the output conductors of said alternator, said saturable reactance having first and second D.C. windings, said first D.C. winding being supplied with the voltage of the installation already in service through a first rectifier and being adjusted to saturate the magnetic circuit of said transducer and thereby reduce to a minimum value the impedance of the conductors therein carrying A.C. current, said second D.C. winding being supplied through a second rectifier with the voltage between the distribution line in normal running and said alternator, said second winding being connected to counteract the effect of said first winding and bring the value of the flux density of said magnetic circuit to zero and the impedance of said A.C. carrying conductors to a maximum when the value of said last mentioned voltage is maximum.

4. A system as claimed in claim 2 in which said at least one alternator has an armature reactance capable of causing up to at least 40% increase in voltage between full and no load running, and exciting means capable of producing a voltage equal to at least 3 times the normal running voltage, said exciting means comprising 3 exciting windings, one of said windings being supplied by the exciter itself and the other two by a magnetic voltage regulating device in said connecting means responsive to the difference between the output voltage of said at least one alternator and that of a steady reference source.

5. A system as claimed in claim 2 comprising a prime mover driving said at least one alternator and mechanism controlling said prime mover for gradually speeding it up towards a driving speed corresponding to the coupling speed of said at least one alternator, in which said connecting means comprises an electro-mechanical device for connecting said alternator to said distribution line before frequency equality and phase coincidence between it and said distribution line are reached.

6. A system as claimed in claim 5 in which said connecting means comprises substantially pure ohmic resistances connected by said electro-mechanical device between said at least one alternator and said line, said system being provided with means for short circuiting said resistors after said alternator has been brought into synchronism with said line.

7. In an A.C. generating and distributing system comprising a distribution line and a plurality of alternators supplying said line, at least one alternator provided with a damper winding, means for connecting said at least one alternator to said line comprising an electro-mechanical device which automatically connects said alternator to said line through a variable impedance before frequency equality and phase coincidence therebetween have been reached so as to permit a synchronizing current to pass through said damper winding, and means for comparing the output voltage of said at least one alternator with that of said line and automatically regulating the impedance of said variable impedance in proportion to the difference therebetween.

8. A system as claimed in claim 7 in which said variable impedance means comprises a saturable reactance, connected between said at least one alternator and said line, a D.C. coil coupling said saturable reactance and maintaining it in a normally saturated condition and a second D.C. coil carrying a current supplied by said voltage comparing means connected to oppose the action of said first D.C. coil and thereby reduce the saturation of said reactance in proportion to the difference between the instantaneous voltages across said alternator output and line.

References Cited in the file of this patent
UNITED STATES PATENTS

| | | |
|---|---|---|
| 1,732,734 | Thomas | Oct. 22, 1929 |
| 1,734,239 | Thomas | Nov. 5, 1929 |
| 1,786,742 | Thomas | Dec. 30, 1930 |
| 2,675,492 | Milne | Apr. 13, 1954 |

FOREIGN PATENTS

| | | |
|---|---|---|
| 17,408 | Norway | Feb. 27, 1907 |